Feb. 2, 1960   G. STAVIS ET AL   2,923,932
AIRCRAFT VERTICAL VELOCITY MEASURING SYSTEM
Filed April 11, 1956   3 Sheets-Sheet 1
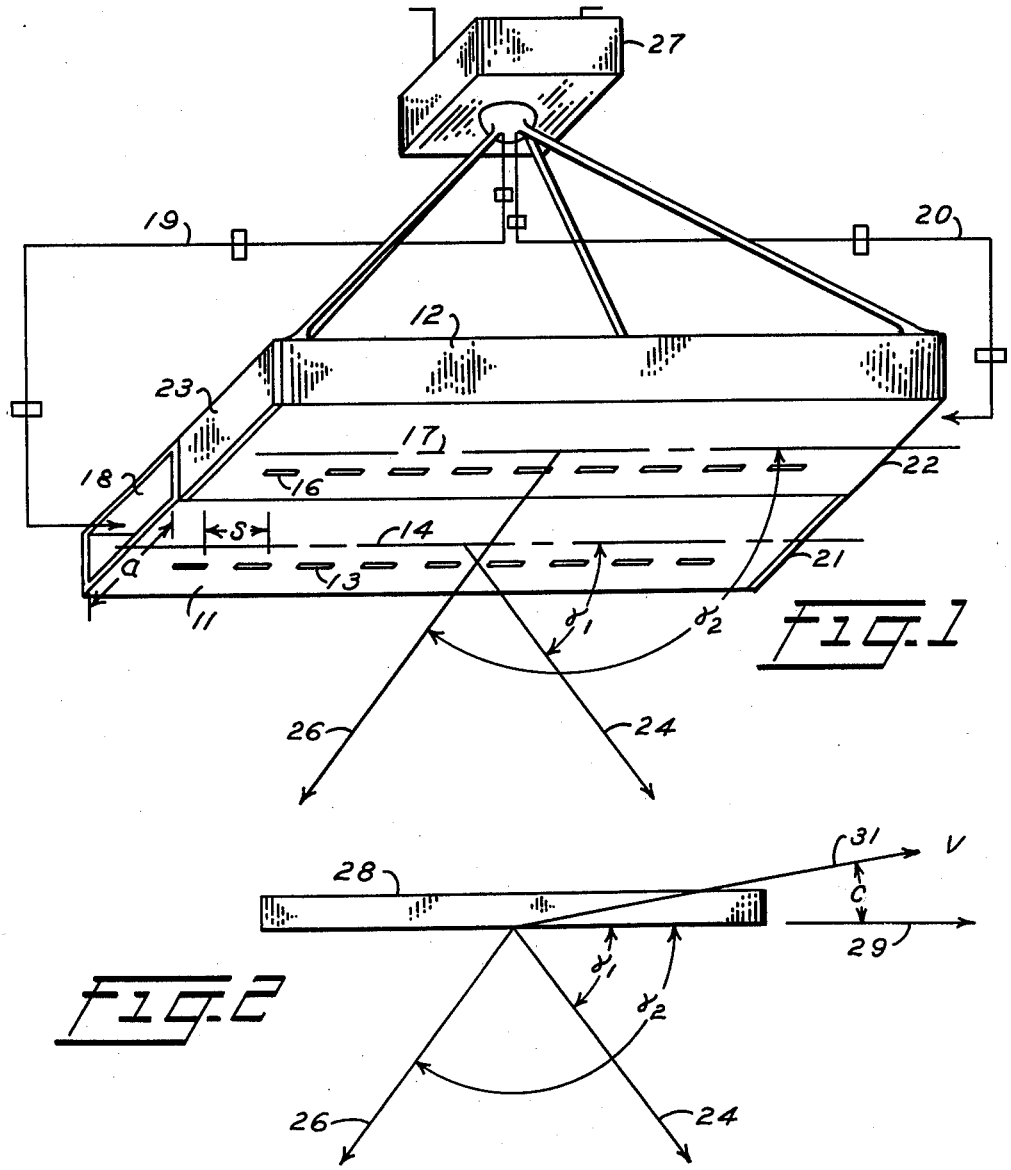
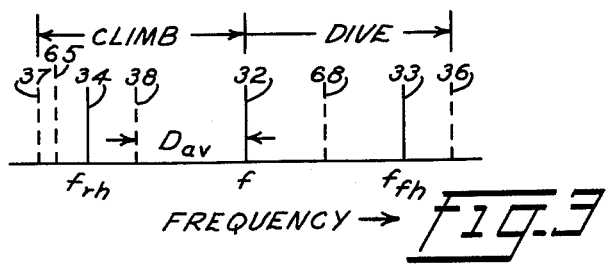
INVENTORS.
GUS STAVIS
SAMUEL BELCHIS
MICHAEL W. McKAY
BY
*H. L. Mackey*
ATTORNEY INVENTORS.
GUS STAVIS
SAMUEL BELCHIS
MICHAEL W. McKAY
BY
ATTORNEY INVENTORS.
GUS STAVIS
SAMUEL BELCHIS
MICHAEL W. McKAY United States Patent Office 2,923,932
Patented Feb. 2, 1960

2,923,932

AIRCRAFT VERTICAL VELOCITY MEASURING SYSTEM

Gus Stavis, Ossining, Samuel Belchis, Yonkers, and Michael W. McKay, Tarrytown, N.Y., assignors to General Precision Laboratory Incorporated, a corporation of New York Application April 11, 1956, Serial No. 577,521

16 Claims. (Cl. 343—8)

This invention relates to self-contained systems for use on vehicles to measure vertical velocity, and is especially adapted for use on aircraft to measure its vertical component of velocity.

In the operation of helicopters and of fixed wing aircraft it is found useful to have a continuous indication of the vertical velocity. In addition, it is useful to have a continuous indication of the altitude above some reference level such as the take-off elevation or sea level. Such altitude indication can easily be secured by integrating the vertical velocity with the addition of a constant determined by the altitude of the take-off point.

In the instant system a microwave antenna is employed which radiates two beams of either pulsed or continuous microwave radiation toward the earth. Earth reflections or echoes of the microwave beams are received by the same antenna and are separately and coherently demodulated to derive two separate low-frequency currents. The frequencies of these two currents represent the Doppler difference frequencies of the two respective microwave beam echoes. Each of these two alternating currents is converted or discriminated, deriving from each a potential magnitude representative of the frequency. These two potential magnitudes are averaged and this average is indicated on a suitable instrument. This indication is then representative of the vertical velocity. Because the vertical velocity measurement must be independent of the aircraft's forward and lateral velocity in the horizontal plane the antenna must be stabilized, or maintained in a horizontal plane.

In the ordinary Doppler radar system both the Doppler frequency and the angle of the microwave beam are affected by changes in the transmitting microwave frequency. However, the present system for vertical velocity measurement makes use of microwave beams of such nature and combines their echoes in such a way as to make the beam angle and the final Doppler frequency output independent of any changes in the transmitting microwave frequency. This is a practical point of great importance, for normal variations in present microwave generators would otherwise interpose an insurmountable barrier to the practical attainment of the objectives of this invention.

The principal object of this invention is to provide a self-contained system for measuring the vertical velocity of an aircraft.

Another object of this invention is to provide microwave apparatus wholly carried on an aircraft for measuring its vertical velocity with high accuracy and for providing a continuous signal and an indication representative thereof.

Another object is to employ Doppler microwave equipment in a system which measures vertical velocity in a restricted range of dive and climb angles.

Another object is to employ special Doppler microwave equipment in a system for measuring vertical velocity in an unrestricted range of dive and climb angles.

Another object is the measurement of vertical velocity by a system including at least two microwave linear arrays, the measurement being unaffected by changes in the transmitting frequency.

Another object is the measurement of vertical velocity by a system including unambiguous measurement of microwave Doppler frequency differences for all angles of dive and climb.

A further understanding of this invention may be secured by reference to the following detailed description, together with the associated drawings, in which:

Fig. 1 is an oblique drawing of one antenna for use with the invention together with its stabilization device, showing the radiated microwave beam directions.

Fig. 2 illustrates the geometry of the two microwave beams employed in the invention.

Fig. 3 illustrates relations of several frequencies employed in the invention.

Fig. 3 is a schematic diagram of one frequency tracker employed by the invention.

Figure 4:
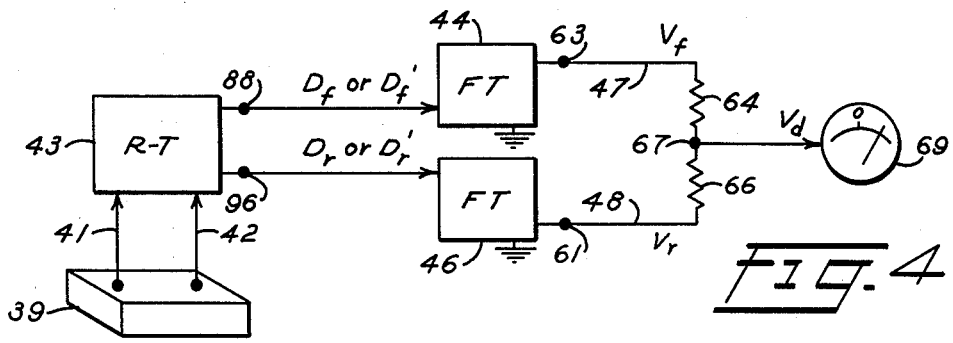
Fig. 4 is a block schematic diagram of circuits and apparatus useful for measuring the vertical velocity.

Referring now to Fig. 1, two linear arrays formed of hollow rectangular microwave guides 11 and 12 are positioned side by side with their lower broad sides in the same horizontal plane. Each array comprises a series of radiators all having the same coupling phase and equally spaced in substantially a straight line on the lower broad side of the guide. Such a linear array is sometimes termed an in-phase array. As an example, shunt slot radiators may be employed as depicted. Array 11 comprises shunt slots 13, all of which are positioned on the same side of the center line 14 of the lower broad face of the guide, and spaced from the center line by suitable coupling distances in accordance with the selected illumination pattern. Array 12 is similar to array 11 with the shunt slots 16 all on the same side of the center line 17.

Linear array 11 is fed at its left end 18 by microwave energy of a selected frequency $f$ and corresponding wavelength in free space $\lambda$ through a wave guide line 19, and any energy remaining at the right end after traversing and feeding array 11 is absorbed by a pad 21 of ferrite, carbon or other nonreflective material closing the end of the waveguide. Linear array 12 is fed at its right end 22 from the same microwave source through waveguide line 20. The left end 23 is likewise nonreflectively terminated.

It may be shown that an in-phase linear array such as described and having selected parameters emits a single microwave beam of radiation with its maximum in the normal plane comprehending the waveguide longitudinal center line and pointing away from the feed end. Thus the beam, represented by arrow 24, of linear array 11 is at an acute angle $\gamma_1$ to center line 14, measured from the right end thereof, and beam 26 of array 12 is at an obtuse angle $\gamma_2$ to the right end of center line 17, and $\gamma_1 = 180 - \gamma_2$. These center lines 14 and 17 may be considered as coincident in describing beam behavior at all ordinary aircraft altitudes.

The pair of linear arrays 11 and 12 forms the antenna of the vertical velocity measuring system. This antenna is mounted in the aircraft and is stabilized or maintained in its horizontal plane by conventional means, indicated by the box 27, which most simply comprises a pendulous vertical reference, pitch and roll motors, and pitch and roll sensing devices. A more elaborate vertical reference may be employed including a vertical gyroscope, or a system including gyroscope with micro-wave controls and accelerometer controls may be used.

The motors included in stabilization device 27 are termed "pitch" and "roll" motors, inferring that the pitch motor rotates the antenna relative to the aircraft about an axis transverse to the aircraft longitudinal axis, and that the roll motor rotates the antenna about a line parallel to the aircraft longitudinal axis. This is indeed usually the case, but in this invention it is only necessary to maintain horizontality of the antenna and it may be done by any means such as by rotation about two mutually perpendicular axes which have no fixed or necessary relation to the aircraft longitudinal direction. By "pitch" and "roll" motors referred to above, then, are merely meant motors stabilizing the antenna about orthogonal axes.

In many cases the antenna must be maintained pointing parallel to the aircraft ground track by the employment of an azimuth motor in the stabilization device 27 to rotate the antenna relative to the aircraft by the amount of the drift angle. In the present invention, however, this is entirely unnecessary, and it may be shown that the accuracy of the vertical velocity indication is completely independent of the azimuth position of the antenna. This is, the antenna may point in the direction of ground track or transverse to the ground track, or at any other azimuth angle. It may indeed change its azimuth angle during measurement of vertical velocity without in any way affecting the measurement.

The parameters influencing the beam angles $\gamma_1$ and $\gamma_2$ are $\lambda$, $a$, the waveguide width, and $s$, the radiator element spacing. The wavelength of the energy in the wave guide, $\lambda_g$, is a function of $\lambda$ and $a$. It may be shown that the beam angle $\gamma_1$ of array 11 is given by $$\cos \gamma_1 = \frac{\lambda}{\lambda_g} \quad (1)$$

Since the arrays are similar, a similar expression gives $\gamma_2$, $$\cos \gamma_2 = -\frac{\lambda}{\lambda_g} \quad (2)$$

the cosine having the opposite sign because $\gamma_1$ is an acute angle and $\gamma_2$ is an obtuse angle. When the antenna of Fig. 1 is airborne and its progression relative to the earth is toward the right, beam 24 projects forward and beam 26 projects aft, the beam directions making equal angles with the vertical direction. However, this is not a required antenna azimuth position, as explained above, and is merely a concept useful in explanation.

Fig. 2 depicts the geometry of the antenna of Fig. 1 and its beams when used to measure vertical velocity. The antenna is represented in side view by the rectangle 28, with its symmetrical beams 24 and 26. To facilitate description the antenna is assumed to be not only stabilized but oriented to point along the ground track in the direction of horizontal arrow 29. This permits the employment of a simple two-dimensional figure in explanation, but it is clearly understood that the explanation of operation is also valid when the antenna points in any other horizontal direction whatever relative to the ground track. The aircraft is climbing, and the direction of its velocity vector V is represented by arrow 31. Since the aircraft is rising the angle of climb $c$ is positive, whereas it would be negative if the aircraft were diving. Since the antenna is held in its horizontal attitude during climbs and dives the directions of the beams 24 and 26 remain as depicted during such maneuvers.

The usual equation for radar beam return frequency is $$f \text{ (echo)} = f + \frac{2V}{\lambda} \cos \gamma \quad (3)$$

in which $f$ is the microwave transmitting frequency, $f$ (echo) is the received frequency, and $\gamma$ is the angle between the radar beam and the direction of velocity vector V. In Fig. 2 this angle is $\gamma_1 + c$ or $\gamma_2 + c$. The equation for the forward beam echo frequency $f_t$ is thus $$f_f = f + \frac{2V}{\lambda} \cos (\gamma_1 + c) \quad (4)$$

and for the rear beam echo frequency $f_r$ is $$f_r = f + \frac{2V}{\lambda} \cos (\gamma_2 + c) \quad (5)$$

For small values of $c$, either positive or negative, $f_t$ is larger than $f$ and $f_r$ is smaller. The average of $f_t$ and $f_r$, however, is always greater than $f$ in diving and less in climbing, and is moreover in accurate relation to the climb or dive angle. This is illustrated qualitatively in Fig. 3.

In level flight it is obvious that the average of the frequencies of the beam returns is exactly the transmitting frequency indicated by the line 32. The forward beam return frequency in level flight $f_{fh}$ is higher than $f$ and is indicated by 33. The rear beam return frequency in level flight $f_{rh}$ is an equal amount lower than $f$ and is indicated by 34. The maximum average frequency will occur at maximum descent rate and is indicated by the line 36, and the minimum average frequency will occur at maximum climb rate and is indicated by the line 37. Average frequencies between lines 37 and 32 thus represent climb conditions, and average frequencies between 32 and 36 represent dive conditions.

It is not desirable to employ frequencies $f_r$ and $f_t$, or their average, directly, because their values will be dependent upon the transmitting frequency $f$, and unavoidable fluctuations in the microwave generator frequency will introduce such large errors as to make such a method worthless.

When Doppler difference frequencies are employed, however, the result is independent of the transmitting frequency, which may be shown as follows. If the beam returns be separately demodulated by the use of a coherent oscillator the Doppler frequencies representative of the last term of Equations 4 and 5 will be secured. These when averaged will give $$D_{av} = \frac{V}{\lambda}[\cos (\gamma_1 + c) + \cos (\gamma_2 + c)] \quad (6)$$

This is represented in Fig. 3 for one climb angle by the distance between frequency 38 and the transmitting frequency 32. Equation 6 reduces to $$D_{av} = -\frac{V}{\lambda} \sin c (\sin \gamma_1 + \sin \gamma_2) \quad (7)$$

Equating $\sin \gamma_1$ and $\sin \gamma_2$ to their cosine relationships and inserting values from Equations 1 and 2, $$\sin \gamma_1 = \sqrt{1 - \left(\frac{\lambda}{\lambda_g}\right)^2} \quad (8)$$

$$\sin \gamma_2 = \sqrt{1 - \left(-\frac{\lambda}{\lambda_g}\right)^2} \quad (9)$$

which for rectangular waveguide reduces to $$\sin \gamma_1 = \sin \gamma_2 = \frac{\lambda}{2a} \quad (10)$$

Substituting in Equation 7

$$D_{av} = -\frac{V \sin c}{a} \quad (11)$$

This equation does not contain either $f$ or $\lambda$ and thus shows that average Doppler frequency is independent of transmitter fluctuations. Moreover, since $V \sin c$ is the vertical component of velocity vector V, the average Doppler frequency, $D_{av}$, is proportional thereto.

This derivation is on the basis of orientation of the antenna to the ground track. However, when the antenna points in any other direction, at an acute angle $\Delta$ with ground track, a similar signal representing vertical velocity and independent of transmitter frequency is secured as follows:

It can be shown that when the antenna of Fig. 1 is oriented at the angle $\Delta$ from the ground track, $$\cos \gamma_1 = +\cos \gamma_0 \cos c \cos \Delta - \sin \gamma_0 \sin c \quad (12)$$
$$\cos \gamma_2 = -\cos \gamma_0 \cos c \cos \Delta - \sin \gamma_0 \sin c \quad (13)$$

$\gamma_0$ is the acute angle between the longitudinal axis of each linear array and the direction of its beam. If the beams be separately demodulated as before and averaged, then by mathematical manipulation similar to that just described the terms containing $\Delta$ drop out and the average Doppler frequency will be found to be given by Equation 11. Therefore, the previous reasoning is applicable when the antenna points in any direction.

When the antenna is pointing exactly or approximately along the ground track, or in any other direction except laterally, an ambiguity exists in the Doppler frequency information which prevents its use directly. For example, when the antenna points forward along the ground track, so that beam 24, Fig. 2, points forward and beam 26 points to the rear, the return frequency from the forward beam $f_t$ is normally higher than $f$ but, when $\gamma_1 + c = 90°$, $f_t$ is equal to $f$ and for larger values of $c$, the return frequency $f_t$ is smaller than $f$. It may also be shown that the return frequency from the rear beam, $f_r$, is normally lower than $f$, but when $\gamma_2 - c = 90°$, $f_r$ is equal to $f$ and for all larger angles of dive $f_r$ is higher than $f$. It is therefore necessary, if the entire range from 90° climb to 90° dive be covered, to distinguish Doppler frequency derived from returns higher than $f$ from Doppler frequency derived from returns lower than $f$. This may be done by suitable sensing of phase reversal when the Doppler frequency passes through zero in the sense that it is zero between these two conditions, or by equivalent means. However, in the particular embodiment to be first described the difficulty is avoided by restricting operation to climb and dive angles $c$ smaller than $90° - \gamma_1$.

In instrumenting this embodiment of the invention the stabilized antenna of Fig. 1 is depicted as antenna 39, Fig. 4, with separate connections 41 and 42 from the antenna applying the two signals containing the beam echo frequencies, $f_t$ and $f_r$, to a conventional dual receiver-transmitter 43 which may contain either a pulsed or continuous-wave transmitter. Here these received energies are separately and coherently demodulated to secure therefrom two low-frequency Doppler signals $D_t$ and $D_r$. As described above, $D_t$ will have any frequency from zero to the top of the Doppler range derived from $f_t$ and $D_r$ will have any frequency from zero to about the same upper limit derived from $f_r$. Either one may be the larger. If $D_t$ be larger, then the average is in the range to the right of line 32, Fig. 3, and dive is indicated, but if $D_r$ be larger then the average is in the range to the left of line 32 and climb is indicated. The signals $D_t$ and $D_r$ must therefore be devloped so as to be separately distinguishable.

This is preferably accomplished by applying these signals to two frequency trackers, 44 and 46, Fig. 4, having direct current outputs. The output conductor 47 of frequency tracker 44 carries a positive direct potential $V_t$ representing by its magnitude the frequency of Doppler signal $D_t$, and the output conductor 48 of frequency tracker 46 carries a negative direct potential $V_r$ representing by its magnitude the frequency of Doppler signal $D_r$.

The frequency trackers 44 and 46 are similar and conventional, and are like that described in copending application Serial No. 314,306, now Patent Number 2,856,519. They are briefly described as follows.

Figure 5:
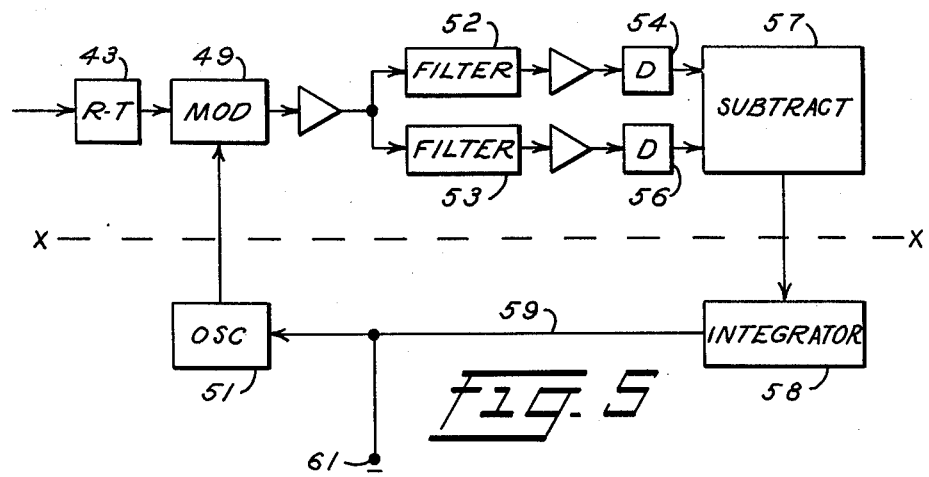

The Doppler frequency output signal of receiver-transmitter 43, Figs. 4 and 5, is applied to a balanced modulator 49 together with the output of an oscillator 51. The modulation product is discriminated in narrow band filters 52 and 53, tuned just above and just below a selected frequency, and the outputs are amplified, detected in detectors 54 and 56 and subtracted in network 57, providing a direct current signal representing in sense and amount the divergence of the modulator output frequency from the selected frequency. This positive or negative error signal is applied to an integrating amplifier 58 which produces an output signal representing the time integral of its input signal. This integrated signal is applied through conductor 59 to control the direct current bias of oscillator 51 and thereby, linearly, its output frequency. This frequency applied to modulator 49 heterodynes the Doppler input frequency to a higher frequency equal to the aforesaid selected frequency. The potential of conductor 59 applied to oscillator 51 is negative at all times, and since oscillator 51 is linear, this potential linearly represents by its magnitude the oscillator output frequency and hence the Doppler frequency. This negative potential is available on terminal 61 as the output of frequency tracker 46, Fig. 4.

Figure 6:
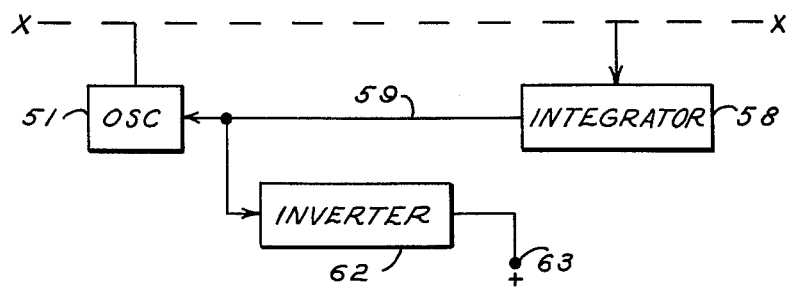
Fig. 6 is a schematic diagram of a modification of Fig. 5 by substitution for components below the line X—X to constitute the other frequency tracker employed by the invention.

The frequency tracker 44 is similar to that just described except for the modification of the circuit elements below the line X—X depicted in Fig. 6. In this modification an inverted 62 is employed, with its output terminal 63 representing the output of the rectangle 44, Fig. 4. Inverter 62 may of course comprise simply an electronic inverting tube with scale-setting networks.

The output signals $V_t$ and $V_r$ of frequency trackers 44 and 46, Fig. 4, are algebraically added in the network comprising two equal resistors 64 and 66, with output from the junction 67. This output will be positive or negative in accordance with the sign of the larger component with a magnitude of twice their average. In graphic form, if the positive output $V_t$ represents the distance in Fig. 3 between line 68 and line 32, and if the negative output $V_r$ represents the distance between lines 65 and 32, the line 38 represents their average and the difference $V_d$ at junction 67, Fig. 4, represents the distance $D_{av}$ between lines 38 and 32, Fig. 3. A negative signal $V_d$ represents $D_{av}$ to the left of 32 or represents climb, and a positive signal $V_d$ represents $D_{av}$ to the right of 32 or represents dive. The signal $V_d$, Fig. 4, is applied to a voltage-operated device, such as a center-zero voltmeter 69, reading climb in degrees to the right of its center zero when a negative signal is applied, and reading dive in degrees to the left of zero on positive signals.

Where it is desired that the system be not limited to climb angles of less than $\gamma_1 + c = 90°$ and dive angles of $\gamma_2 - c = 90°$ and to provide a system operative for all climb angles from zero to 90° and for all dive angles from zero to 90°, the modified system as hereinafter described may be used. As earlier inferred, $f_t$ may be either much larger than $f$ or slightly smaller, so that if $f_t$ and $f$ in effect be subtracted as in conventional receiver-transmitters to secure a signal containing the Doppler difference frequency, the Doppler frequencies will be ambiguous, each specific frequency therein representing two different climb or dive angles. Similarly, values of the Doppler difference frequency derived from $f_t$ ambiguously represent two angles. It therefore is necessary to modify the receiver-transmitter 43, Fig. 4, so that it will emit two Doppler-like unambiguous signals, each representing the frequency of the echo return of each of the beams respectively through the mentioned 180° dive-climb range.

Figure 7:
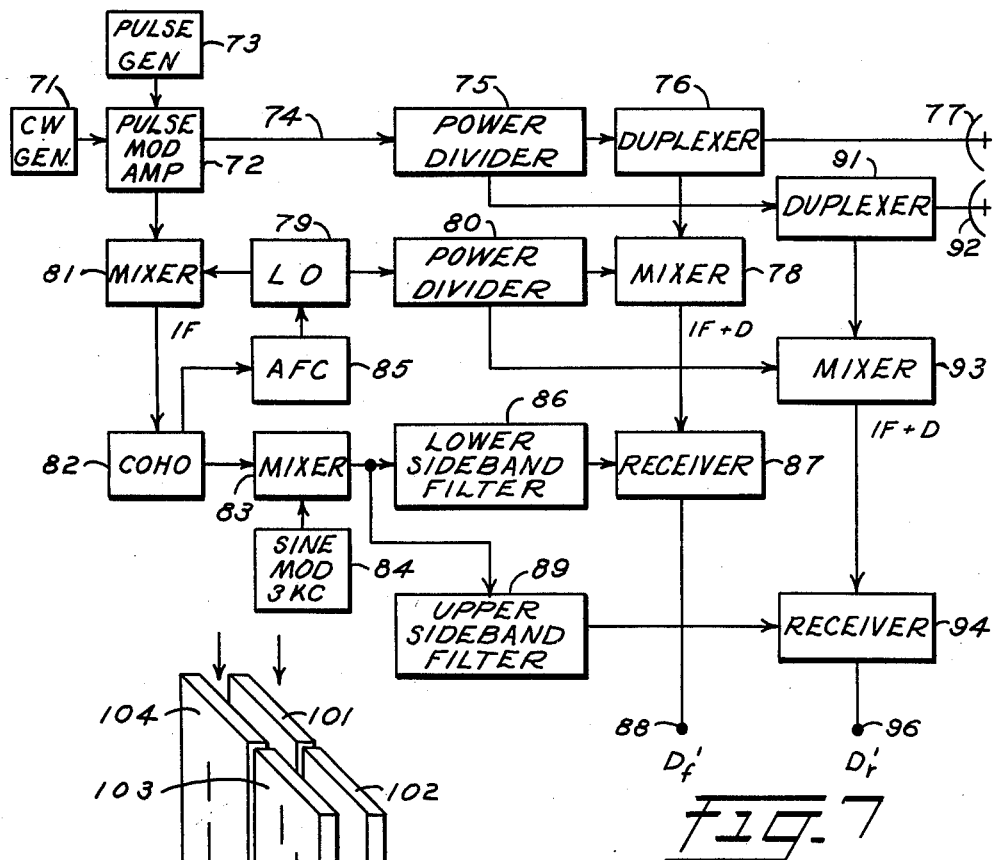
Fig. 7 depicts the circuits of a transmitter-receiver for use with one modification of the invention.

The block diagram of a receiver-transmitter to accomplish this is depicted in Fig. 7. A continuous wave microwave generator 71 energizes a pulse modulated amplifier 72 to which is also connected pulse generator 73. This method of securing pulsed microwave energy has the advantage of providing, during demodulation of the received energy, coherence during not only the first pulse period following transmission but during all subsequent pulse periods as well. Other methods of securing pulsed beams may be employed, or the continuous-wave beam method may be employed.

The output in conductor 74 consists of pulses of the energy of generator 71. This pulsed energy is applied through power divider 75 and duplexer 76 to antenna 77 which consists of one of the linear arrays of Fig. 1, for example, array 11. The received energy having a frequency $f+D$, being the sum of the transmitter microwave frequency $f$ and the Doppler modulation D, is applied to mixer 78, Fig. 7. A local oscillator 79 having the frequency of the transmitter minus the intermediate frequency, or $f-IF$, is connected through power divider 80 to mixer 78 and demodulates the signal to $IF+D$. Since the signal having frequency D is derived from the signal having frequency $f_t$, which may be either larger or smaller than frequency $f$, $IF+D$ may be either more or less than frequency IF. The output of pulse modulator 72 is also applied to a phasing mixer 81, as is the output of local oscillator 79, to form a pulse output at the IF frequency. This is applied to phase an IF coherent oscillator 82 which automatically controls the frequency of local oscillator 79 through control component 85. This oscillator output is also applied to a mixer 83 to which is also applied a sinusoidal single-frequency modulation from a sine wave generator forming an amplitude-modulated output at IF carrier frequency. This modulating frequency output of generator 84 is equal to or a little larger than the ambiguous frequency range of each of the Doppler difference signals as before described. The output of mixer 83 contains the IF carrier frequency flanked by two sideband frequencies. If, for example, the output of modulating generator 84 has a frequency of 3 kc., the coherent oscillator output sidebands are 3 kc. above and below the carrier frequency.

A sideband filter 86 is provided which passes the lower sideband, suppressing the carrier and higher sideband. The output, having a frequency in this example of $IF-3$ kc., is applied to a receiver 87 to which the signal $IF+D$ from mixer 78 also is applied, producing a demodulation product by heterodyning. When $IF+D$ is, for most of the range of D, larger than IF, and if it is never more than 3 kc. less than IF, the output at terminal 88 is always unambiguous. This follows from the principle of heterodyning, by which is meant multiplication of alternating potentials followed by selection of the lower sideband or difference frequency. In this case the difference frequency is $$IF+D-(IF-d) \quad (14)$$

in which $d$ is the 3 kc. frequency. The demodulated frequency $D_f'$ is therefore $$D_f'=D+d \quad (15)$$

This signal appears at terminal 88, Figs. 4 and 7, and is the output previously termed $D_f$ but in this embodiment termed $D_f'$.

The output of mixer 83, Fig. 7, is also applied to a second filter 89 which passes the upper sideband of $IF+3$ kc., suppressing the carrier and lower sideband. The output in conductor 74 of pulse modulator 72 is applied through power divider 75 and a second duplexer 91 to a second antenna 92 representing linear array 12, Fig. 1. The echo output of duplexer 91 is applied, together with the output of local oscillator 79 through power divider 80, to a mixer 93 producing an output $IF+D$. This output is, however, for most of the range from 90° climb to 90° dive, less than IF in frequency. In that sense, then, the frequency D may be considered negative, so that the expression for the output of mixer 93 becomes $IF-D$. This signal is applied to a second receiver 94, where it is multiplied by the upper sideband signal from filter 89 to form the demodulated frequency $$D_r'=IF-D-(IF+d)=-D-d \quad (16)$$

The signal output having this frequency is emitted at terminal 96, Figs. 4 and 7, and unambiguously represents the Doppler difference frequency signal return from antenna 92 for the same reasons as set forth above in connection with the derivation of the signal $D_f'$.

Figure 8:
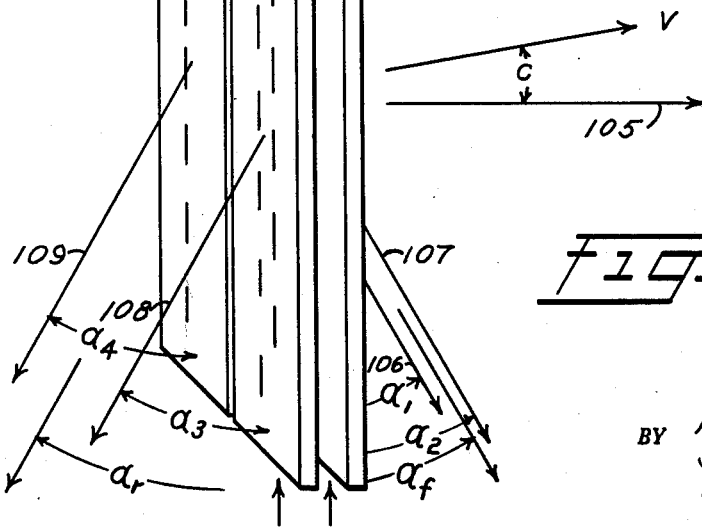
Fig. 8 is an oblique drawing of another antenna for use with the invention.

A second form of antenna useful in connection with the invention is illustrated in Fig. 8. This antenna comprises four linear arrays 101, 102, 103 and 104 all positioned vertically and stabilized to remain vertical by means such as described in connection with the horizontal stabilization of the antenna of Fig. 1. Arrays 101 and 104 are in-phase arrays and are fed from the top so that each emits a downward beam. Since the arrays are identical but placed back to back, array 101 emits a beam 106 forward of the vertical, the aircraft forward direction in the horizontal plane being indicated by arrow 105. The angle made by beam 106 with the vertical is $\alpha_1$. Array 104 emits beam 109 to the rear at angle $\alpha_4$ equal to $\alpha_1$ in magnitude. Arrays 102 and 103 are antiphase arrays back to back fed from the bottom, with their beams 107 and 108 making equal angles $\alpha_2$ and $\alpha_3$.

It may be shown that $$\cos \alpha_1 = \cos \alpha_4 = \frac{\lambda}{\lambda_g} \quad (17)$$

for the in-phase arrays 101 and 104, and that $$\cos \alpha_2 = \cos \alpha_3 = -\frac{\lambda}{\lambda_g} + \frac{\lambda}{2s} \quad (18)$$

for the antiphase arrays 102 and 103. It may also be shown that when the directions of beams 106 and 107 are nearly the same, that is, when $\alpha_1$ nearly equals $\alpha_2$, the average direction is $$\cos \alpha_f = \frac{\cos \alpha_1 + \cos \alpha_2}{2} \quad (19)$$

Similarly if $\alpha_3$ approximately equals $\alpha_4$, $$\cos \alpha_r = \frac{\cos \alpha_3 + \cos \alpha_4}{2} \quad (20)$$

Combining Equations 17 and 12 with 19 and 20, $$\cos \alpha_f = \cos \alpha_r = \frac{\lambda}{4s} \quad (21)$$

It is desirable, however, to measure the beam angles from the horizontal direction 105, so that $$\gamma_f = 90° - \alpha_f \quad (22)$$

and $$\gamma_r = 90° + \alpha_r \quad (23)$$

Equations 4 and 5 then become $$f_f = f + \frac{2V}{\lambda} \cos (90 - \alpha_f + c) \quad (24)$$

in which $c$ is as before the angle of climb or dive, and $$f_r = f + \frac{2V}{\lambda} \cos (90 + \alpha_r + c) \quad (25)$$

The last terms represent Doppler frequency differences, which may be combined if separately and coherently demodulated. The expression for their average which may thus be obtained is $$D_{av} = \frac{1}{2} \left[ \frac{2V}{\lambda} \cos (90 - \alpha_f + c) + \frac{2V}{\lambda} \cos (90 + \alpha_r + c) \right] \quad (26)$$

$$= -\frac{V \sin c}{\lambda} (\cos \alpha_f + \cos \alpha_r) \quad (27)$$

since $\alpha_f = \alpha_r = \alpha$, $$D_{av} = -\frac{2V \sin c}{\lambda} \cos \alpha \quad (28)$$

Since from (21)

$$\cos \alpha = \frac{\lambda}{4s}$$

$$D_{av} = -\frac{V \sin c}{2s}$$

Thus it is clearly apparent that when an antenna of this form is used the average of the two average Doppler difference frequencies equal the vertical velocity ($V \sin c$) divided by a constant and is independent of any horizontal velocity and of the transmitting frequency. Thus either of the antennas of Figs. 1 and 8 may be used in connection with this invention, the only difference in their use being the value of a scale constant.

What is claimed is:

1. A system completely contained on an aircraft for measuring the vertical velocity thereof comprising, a microwave transmitter including a stabilized antenna radiating two oblique beams in a vertical plane toward the earth as a target, the angles made with the vertical direction by said two beams being equal, a microwave receiver separately and coherently demodulating the reflected energies of said beams to produce two signals representative of the Doppler frequency differences in said beams caused by relative motion of said transmitter and said earth target, two frequency trackers individually tracking a respective one of said two signals and deriving from each a component signal having a potential representative of said Doppler frequency differences, an averaging circuit deriving from said two component signals a signal potential representing the arithmetical average thereof, said signal potential being independent of the frequency of said microwave transmitter and of any horizontal velocity thereof, and means indicating the amount and sense of said signal potential, said indication representing vertical velocity.

2. An aircraft vertical velocity measuring system comprising, means for generating microwave energy, stabilized antenna means radiating said microwave energy towards the earth's surface in at least a pair of beams lying in a vertical plane at equal angles as respects the vertical and receiving echo signals reflected from the earth's surface having Doppler-shifted frequencies, the average Doppler shift of which is representative solely of the vertical velocity component of the aircraft, means for demodulating said echo signals to produce Doppler frequency signals, means having said Doppler frequency signals impressed thereon and producing therefrom a pair of potentials the magnitudes of respective ones of which are representative of the Doppler frequencies of respective ones of said Doppler frequency signals, means for deriving the arithmetical average of said pair of potentials, and means for indicating said average.

3. An aircraft vertical velocity measuring system as set forth in claim 2 in which said stabilized antenna means includes a pair of linear in-phase arrays positioned parallel to each other and stabilized in a horizontal plane, said arrays being energized at opposite ends as respects each other.

4. An aircraft vertical velocity measuring system as set forth in claim 2 in which said stabilized antenna means includes, a pair of in-phase linear arrays positioned in parallel back-to-back relation and a pair of antiphase linear arrays positioned in parallel back-to-back relation with longitudinal edges thereof parallel with and contiguous to longitudinal edges of said in-phase arrays, all of said arrays being stabilized in a vertical plane, and said in-phase arrays being energized at like ends opposite to those at which said antiphase arrays are energized.

5. An aircarft vertical velocity measuring system comprising, means for generating microwave energy, stabilized antenna means radiating said microwave energy towards the earth's surface in at least a pair of beams lying in a vertical plane at equal angles as respects the vertical and receiving echo signals reflected from the earth's surface having Doppler shifted frequencies, the average Doppler shift of which is representative solely of the vertical velocity component of the aircraft, means for demodulating said echo signals to produce a pair of Doppler frequency signals, a frequency tracker means having one of said Doppler frequency signals impressed thereon and producing therefrom an output potential the magnitude of which is representative of the Doppler frequency of the impressed signal, a second frequency tracker means having the other of said Doppler frequency signals impressed thereon and producing therefrom an output potential the magnitude of which is representative of the Doppler frequency of the impressed signal, means for inverting one of said output potentials, an averaging circuit having said inverted output potential and the other output potential impressed thereon, and indicating means connected to said averaging circuit indicating the average of the potentials impressed thereon.

6. An aircraft vertical velocity measuring system as set forth in claim 5 in which said stabilized antenna means includes a pair of linear in-phase arrays positioned in parallel side-by-side relationship as respects each other and stabilized in a horizontal plane, said arrays being energized at opposite ends as respects each other.

7. An aircraft vertical velocity measuring system as set forth in claim 5 in which said stabilized antenna means includes a pair of in-phase linear arrays positioned in parallel back-to-back relation and a pair of antiphase linear arrays positioned in parallel back-to-back relation with longitudinal edges thereof parallel with and contiguous to longitudinal edges of said in-phase arrays, all of said arrays being stabilized in a vertical plane, and said in-phase arrays being energized at like ends opposite to those at which said antiphase arrays are energized.

8. An aircraft vertical velocity measuring system comprising, means for generating microwave energy, stabilized antenna means radiating said microwave energy towards the earth's surface in at least a pair of beams lying substantially in a vertical plane at equal angles as respects the vertical and receiving echo signals reflected from the earth's surface having Doppler-shifted frequencies, the average Doppler shift of which is representative solely of the vertical velocity component of the aircraft, a coherent oscillator, a modulating oscillator, means for mixing the outputs of said coherent oscillator and said modulating oscillator to produce a heterodyne signal having upper and lower sidebands, means for mixing one of the received echo signals with only the upper sideband of said heterodyne signal to produce a first unambiguous Doppler frequency signal, means for mixing another of the received echo signals with only the lower sideband of said heterodyne signal to produce a second unambiguous Doppler frequency signal, means for converting said first and second Doppler frequency signals into a pair of potentials the magnitudes of which are respectively proportional to the frequencies thereof, means for obtaining the arithmetical average of said potentials, and means for indicating said average.

9. An aircraft vertical velocity measuring system as set forth in claim 8 in which said stabilized antenna means includes a pair of linear in-phase arrays positioned in parallel side-by-side relationship as respects each other and stabilized in a horizontal plane, said arrays being energized at opposite ends as respects each other.

10. An aircraft vertical velocity measuring system as set forth in claim 8 in which said stabilized antenna means includes a pair of in-phase linear arrays positioned in parallel back-to-back relation and a pair of antiphase linear arrays positioned in parallel back-to-back relation with longitudinal edges thereof parallel with and contiguous to longitudinal edges of said in-phase arrays, all of said arrays being stabilized in a vertical plane, and said in-phase arrays being energized at like ends opposite to those at which said anti-phase arrays are energized.

11. An aircraft vertical velocity measuring system comprising, means for generating microwave energy, stabilized antenna means radiating said microwave energy towards the earth's surface in at least a pair of beams lying substantially in a vertical plane at equal angles as respects the vertical and receiving echo signals reflected from the earth's surface having Doppler-shifted frequencies, the average Doppler shift of which is representative solely of the vertical velocity component of the aircraft, local oscillator means, means for combining the output of said local oscillator with the received Doppler-shifted echo signals to produce a pair of Doppler-shifted intermediate frequency signals, controlled oscillator means generating an output signal at said intermediate frequency, low frequency oscillator means, means for mixing the outputs of said controlled oscillator means and said low frequency oscillator means to produce a double-sideband heterodyne signal therefrom, means for mixing one of said Doppler-shifted intermediate frequency signals with only the upper sideband of said heterodyne signal to produce a first unambiguous signal containing Doppler frequency information, means for mixing the other of said Doppler-shifted intermediate frequency signals with only the lower sideband of said heterodyne signal to produce a second unambiguous signal containing Doppler frequency information, means for converting said first and second unambiguous signals into a pair of potentials the magnitudes of which are respectively proportional to the frequencies thereof, means for obtaining the arithmetical average of said potentials, and means for indicating said average.

12. An aircraft vertical velocity measuring system as set forth in claim 11 in which said stabilized antenna means includes a pair of linear in-phase arrays positioned in parallel side-by side relationship as respects each other and stabilized in a horizontal plane, said arrays being energized at opposite ends as respects each other.

13. An aircraft vertical velocity measuring system as set forth in claim 11 in which said stabilized antenna means includes a pair of in-phase linear arrays positioned in parallel back-to-back relation and a pair of antiphase linear arrays positioned in parallel back-to-back relation with longitudinal edges thereof parallel with and contiguous to longitudinal edges of said in-phase arrays, all of said arrays being stabilized in a vertical plane, and said in-phase arrays being energized at like ends opposite to those at which said antiphase arrays are energized.

14. An aircraft vertical velocity measuring system comprising, means for generating pulsed microwave energy, stabilized antenna means radiating said microwave energy towards the earth's surface in at least a pair of beams lying substantially in a vertical plane at equal angles as respects the vertical and receiving pulse echo signals reflected from the earth's surface having Doppler-shifted frequencies, the average Doppler shift of which is representative solely of the vertical velocity component of the aircraft, local oscillator means, means for combining the output of said local oscillator with the received Doppler-shifted echo signals to produce a pair of Doppler-shifted intermediate frequency signals, a coherent oscillator generating an output signal at said intermediate frequency having its phase controlled by the phase of said pulsed microwave energy, a low frequency oscillator, means for mixing the outputs of said coherent oscillator and said low frequency oscillator to produce a double sideband heterodyne signal therefrom, means for mixing one of said Doppler-shifted intermediate frequency signals with only the upper sideband of said heterodyne signal to produce a first unambiguous signal containing Doppler frequency information, means for mixing the other of said Doppler-shifted intermediate frequency signals with only the lower sideband of said heterodyne signal to produce a second unambiguous signal containing Doppler frequency information, means for converting said first and second unambiguous signals into a pair of potentials the magnitudes of which are respectively proportional to the frequencies thereof, means for obtaining the arithmetical average of said potentials, and means for indicating said average.

15. An aircraft vertical velocity measuring system as set forth in claim 14 in which said stabilized antenna means includes a pair of linear in-phase arrays positioned in parallel side-by-side relationship as respects each other and stabilized in a horizontal plane, said arrays being energized at opposite ends as respects each other.

16. An aircraft vertical velocity measuring system as set forth in claim 14 in which said stabilized antenna means includes a pair of in-phase linear arrays positioned in parallel back-to-back relation and a pair of antiphase linear arrays positioned in parallel back-to-back relation with longitudinal edges thereof parallel with and contiguous to longitudinal edges of said in-phase arrays, all of said arrays being stabilized in a vertical plane, and said in-phase arrays being energized at like ends opposite to those at which said anti-phase arrays are energized.

References Cited in the file of this patent

UNITED STATES PATENTS

| | | |
|---|---|---|
| 1,864,638 | Chilowsky | June 28, 1932 |
| 2,223,224 | Newhouse | Nov. 26, 1940 |
| 2,403,625 | Wolff | July 9, 1946 |
| 2,422,064 | Anderson et al. | June 10, 1947 |
| 2,426,228 | Mackta | Aug. 26, 1947 |
| 2,855,590 | Gray | Oct. 7, 1958 |

OTHER REFERENCES

Loque, S. H.: Measuring Rate-of-Climb, Electronic Industries and Tele-Tech, Oct. 1956, pp. 74, 75.